United States Patent [19]

Derby et al.

[11] Patent Number: 5,398,012

[45] Date of Patent: Mar. 14, 1995

[54] DISTRIBUTED PROCESSING OF ROUTE SELECTION ACROSS NETWORKS AND SUBNETWORKS

[75] Inventors: Jeffrey H. Derby, Chapel Hill, N.C.; Willibald A. Doeringer, Langnau, Switzerland; John E. Drake, Jr., Pittsboro, N.C.; Douglas H. Dykeman, Rueschlikon, Switzerland; Haldon J. Sandick, Durham; Ken V. Vu, Cary, both of N.C.

[73] Assignee: International Business Machines Corporation, Armonk, N.Y.

[21] Appl. No.: 980,854

[22] Filed: Nov. 24, 1992

[51] Int. Cl.⁶ .................. H04Q 11/04; H04L 11/20
[52] U.S. Cl. .................. 340/825.03; 340/826; 340/827; 370/54
[58] Field of Search ............ 340/825.03, 826, 827; 370/54; 379/220, 221

[56] References Cited

U.S. PATENT DOCUMENTS 4,873,517 10/1989 Baratz et al. .............. 340/825.03
5,193,151 3/1993 Jain ............................ 370/94.1

OTHER PUBLICATIONS

SIGCOMM '90 Symposium, vol. 20, No. 4, Sep. 4, 1990, Philadelphia, Pa. "Topology Distribution Cost vs. Efficient Routing in Large Networks" by A. Bar-Noy and M. Gopal, pp. 242-252.
IEEE INFOCOM '88, Mar. 27, 1988, New Orleans, La., "Distributed Routing Using Topology Database in Large Computer Networks" by K. Jeong Lee and B. Kadaba, pp. 593-602.

Primary Examiner—Michael Horabik
Attorney, Agent, or Firm—Gerald R. Woods

[57] ABSTRACT

The process for determining the best communication route from a source end station to a destination end station is distributed over both source and destination network nodes. Network nodes, at the interface between a wide area network (WAN) and each subnetwork, contain access agents to control the communication flow between the wide area network and an end station in the subnetwork. The task of selecting the best route between two end stations is distributed between the access agents at the WAN interface in the first subnetwork, and the access agents at the WAN interface in the second subnetwork. Each access agent at one WAN interface obtains the best route from itself to the end station in its subnetwork. Each access agent at the other WAN interface finds the best route from each access agent at the first WAN interface through itself to the end station in its subnetwork. One designated access agent collects all the best route information. This best route information is concatenated, and the route with the least weight is selected as the best route between end stations.

15 Claims, 8 Drawing Sheets

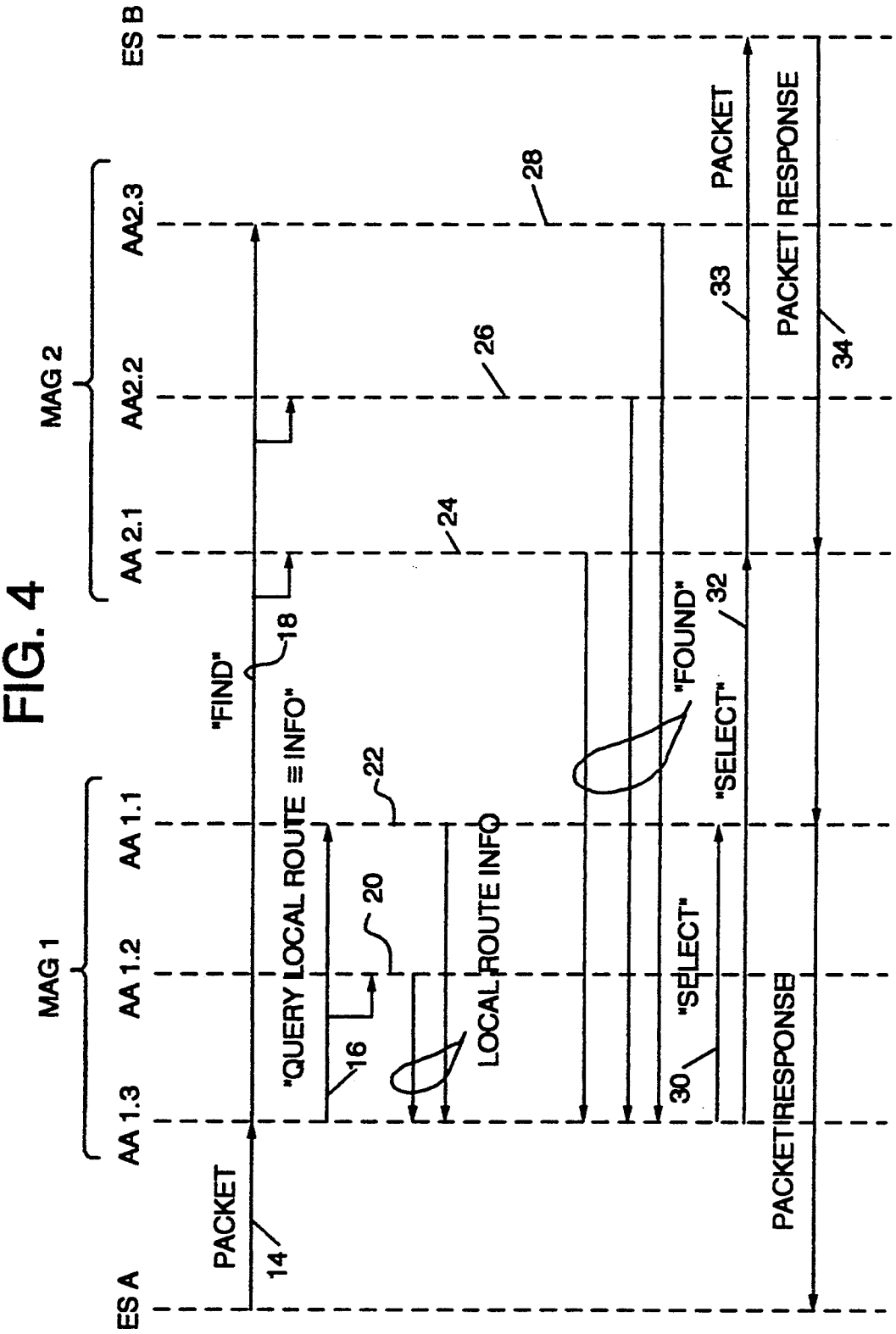

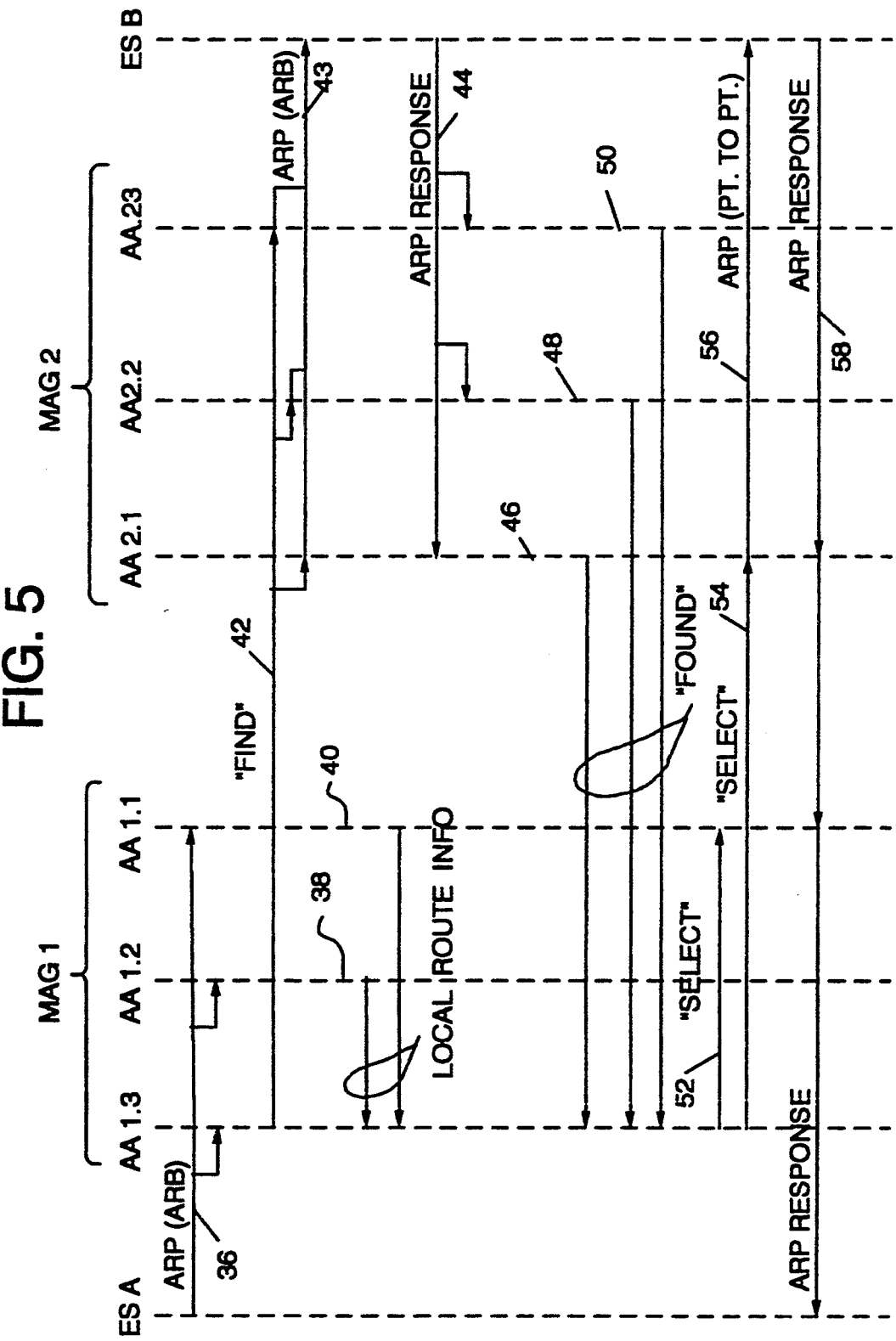

DISTRIBUTED PROCESSING OF ROUTE SELECTION ACROSS NETWORKS AND SUBNETWORKS

BACKGROUND OF THE INVENTION

1. Field of the Invention

The present invention relates to communications networks and, more particularly, to a method of selecting a least weight route between two end stations, or end nodes, in the network.

2. Description of Prior Art

For purposes of the following descriptions, a communications network can be generally defined as a collection of network nodes and end nodes, or end stations, interconnected through communications links. A network node can be characterized as a data processing system that provides certain functions within the network, such as routing of messages between itself and its adjacent, or neighboring, nodes, selection of routes for messages to be transmitted between two nodes, and the furnishing of directory services to connected end nodes. The link between nodes may be permanent communications links, such as conventional cable connections or links, that are enabled only when needed, such as dial-up telephone connections. End nodes are exemplified by devices, such as display terminals, intelligent workstations, printers, and the like, which do not provide routing or route selection or directory services to other nodes in the network. Collectively, the network nodes, the end nodes and the links between the nodes are referred to as network resources. The physical configuration and characteristics of the various nodes and links in a network are said to be the topology of the network.

For a user at one end node to exchange data with another user at another end node, a path, or route, must be set up through the network. The route will include the end node at which the first user is located (the source end node), the end node at which the second user is located (the destination end node), possibly one or more network nodes and the links, or transmission groups, which connect the nodes on the route. A transmission group is normally defined as a set of parallel links with similar characteristics that form a single logical link that has a higher capacity than each of the individual links in the group. For purposes of the following discussion, it should be assumed that the term transmission group can also contemplate a single physical link. The terms are used interchangeably in the following description.

In an ideal network, data provided by a first user is transmitted to a second user at no cost, with zero delays, with perfect reliability, and with complete security regardless of how many nodes and transmission groups might be included in the route between the two users. Unfortunately, real data communications networks lack these ideal characteristics. Varying amounts of delays may be introduced over different routes. Some types of transmission groups may cost more to use, or introduce more delay than others. The integrity of transmitted data may be protected better on some transmission groups than others. Other "imperfections" not even discussed above exist in a real network.

Because nodes and transmission groups in a real network possess different characteristics, it is a common practice to assign weights to both nodes and transmission groups, and to use the assigned weights in computing an optimal, or least, weight route through the network from one user to another. The weight generally reflects how closely a given node, or transmission group, meets a predetermined standard of performance. For example, if weights were to be assigned on the basis of delay characteristics alone, a high-delay transmission group would have a greater assigned weight than a low-delay transmission group.

In U.S. Pat. No. 4,873,517, entitled "Method For Selecting Least Weight End Node to End Node Route In A Data Communication Network" and issued to A. E. Baratz et al, a "best" route, through a network from a first user at one end node, or end station, to a second user at another end node, or end station, is determined by summing the weight of nodes and transmission groups in various potential routes. The route having the lowest total weight, which is understandably referred to as the least-weight route, is considered to be the "best" route between the users.

When a first user requests that a path be established through the network to a second user, information as to the characteristics of the transmission groups connecting both user's end nodes to network nodes is furnished by the user's end nodes to the network node responsible for the route computation. This network node calculates an optimal route through the network in a staged process. First, the information received from the end nodes is used to calculate optimal routes from the end nodes to all network nodes to which those end nodes are connected. Next, the network node uses information stored in its own network topology database to calculate optimal routes from a first set of network nodes to a second set of network nodes. The first set of network nodes is all network nodes connected to the first user's end node. The second set of network nodes is all network nodes connected to the second user's end node. The results of the end node to network node calculations and network node to network node calculations are concatenated, or combined, to determine the optimal end node to end node route through the network.

FIG. 1 is an example of a communication network from the Baratz et al patent. The illustrated network includes a plurality of network nodes NNA, NNB, NNC, NND, NNE and NNF. The various network nodes are interconnected by transmission groups illustrated only as single lines. A number of end nodes, EN1 through EN10, are connected to various ones of the network nodes. Certain end nodes may be connected to more than one network node, and/or may have parallel transmission groups to the same network node. For example, end node EN2 is connected to both network node NNA and NNB with two parallel transmission groups to network node NNB. Similarly, end node EN6 is connected to both network nodes NND and NNF with three parallel transmission groups to node NNF.

As mentioned above, weights are assigned to each transmission group and network node in the network. These weights represent the "cost" of using the node, or transmission group, to transmit data. In the figure, the weights are represented by numerals either appearing within the symbol for the network node, or adjacent the line representing the transmission group connecting the network nodes. The weight values themselves appearing in the figure are arbitrarily selected for purposes of illustration, and should not be interpreted as actual numerical values that would be assigned in a typical date communications network. The figure also shows weights assigned to transmission groups connecting end nodes to their adjacent network nodes. While the weights assigned to the end node transmission groups are known to the end nodes, they may not be known to the network nodes if the network nodes maintain a topology database containing only information about the network nodes themselves and the transmission groups which interconnect the network nodes. While the information stored in the network nodes is adequate to allow the network nodes to compute optimal routes between any two network nodes, it is not adequate to permit a network node to compute an optimal route between two end nodes.

To allow a network node to compute an optimal end node to end node route, information about the transmission groups connecting the end nodes to adjacent network nodes must be made available to the network node responsible for the route computation. The prior art process for making such information available is described with reference to FIG. 2 from the Baratz et al patent. FIG. 2 is a time-based chart of messages which flow through the network when a user located at an end node EN2 desires to communicate with a user located at end node EN6. The source end node EN2 sends a Message Unit (MU) to the network node NNB having responsibility for providing routing services to EN2. The message includes information, or vectors, about the transmission groups which connect EN2 to both NNA and NNB. The transmission group vectors are saved at NNB, and the message is forwarded through the network via nodes NNC and NNF to end node EN6. End node EN6 responds with a Message Unit Reply (MUR) including information about the transmission groups which connect end node EN6 to its two adjacent network nodes, NND and NNF. The reply is forwarded through the network to the serving network node NNB, which saves the destination transmission group vectors.

Network node B then has the information it needs to compute an optimal route through the network between the origin end node EN2 and the destination end node EN6. As mentioned earlier, the computations are staged with the optimal end node to network node routes being computed separately from the routes between network nodes. All of the computations for determining best route take place in network node B.

SUMMARY OF THE INVENTION

It is an object of this invention to distribute the data processing tasks necessary to perform route selection in a communication network.

It is a further object of this invention to offload route selection tasks from end nodes or end stations.

In accordance with this invention, the above objects are accomplished by distributing the best route determination process over both source and destination network nodes. The network nodes at the interface between a Wide Area Network (WAN) and a subnetwork contain access agents to control the communication flow between the wide area network and an end station in the subnetwork. When a first end station in a first subnetwork requests communication between itself and a second end station in a second subnetwork, the task of selecting the best route between the two end stations is distributed between the access agents at the WAN interface in the first subnetwork, and the access agents at the WAN interface in the second subnetwork.

Each access agent in the subnetwork group of access agents associated with the source end station obtains the best local route from itself to the source end station. Each access agent in the subnetwork group of access agents associated with the destination end station obtains the best local route from itself to the destination end station. In addition, the access agents in one of these subnetwork groups finds the best route across the WAN from each access agent in the source subnetwork to each access agent in the destination subnetwork, and then combines its best local route information with the best route information across the WAN. One designated access agent in the source subnetwork group now serves to collect and combine all the best route information found by the access agents at the source and destination subnetworks. This best route information is concatenated, and the route with the least weight is selected as the best route between end stations.

Other objects and features of the invention will be understood by those of ordinary skill in the art after referring to the complete written description of the preferred embodiments of the invention.

BRIEF DESCRIPTION OF THE DRAWINGS

FIG. 4 is a time-based communication message flowchart illustrating the operation of one embodiment of the invention in selecting the best route for communication between end stations ES-A and ES-B in FIG. 3.

FIG. 5 is a time-based communication message flowchart illustrating the operation of another embodiment of the invention in selecting the best route for communication between end stations ES-A and ES-B in FIG. 3.

FIG. 8B shows the process and operation of the preferred embodiment of the invention as implemented in the destination-end access agent selected for the best route.

DESCRIPTION OF THE PREFERRED EMBODIMENTS

Figures 1, 2:
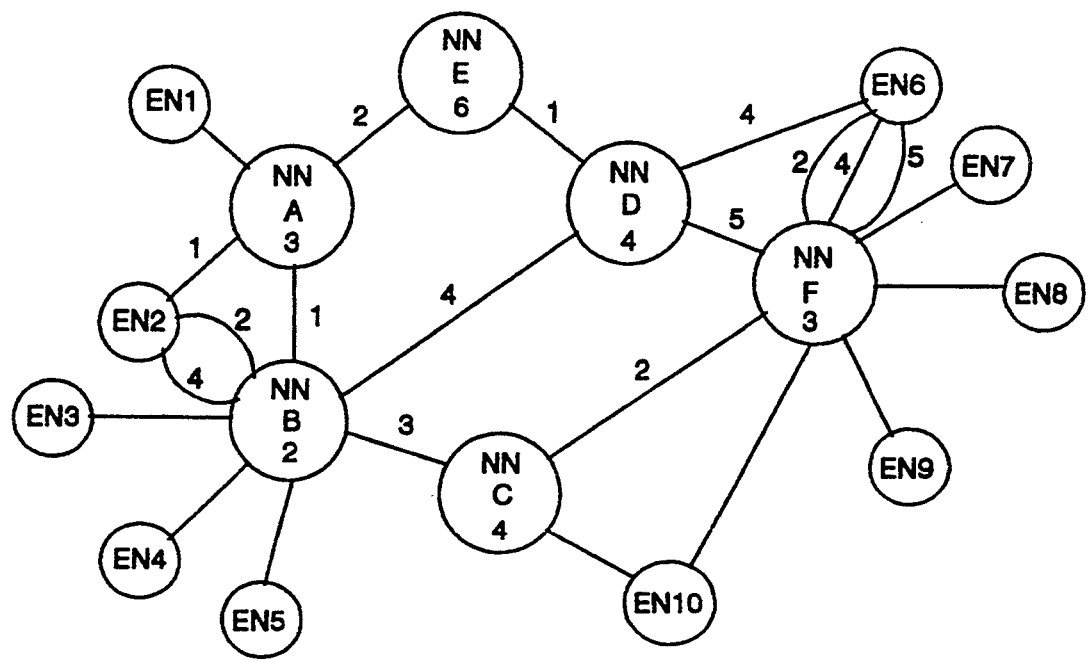
FIG. 1, described above under description of prior art, shows an example of a communication network in which best route selection is performed.
FIG. 2, described above, shows the prior art process for gathering route information used in making the best route selection in the network of FIG. 1.
Figure 3:
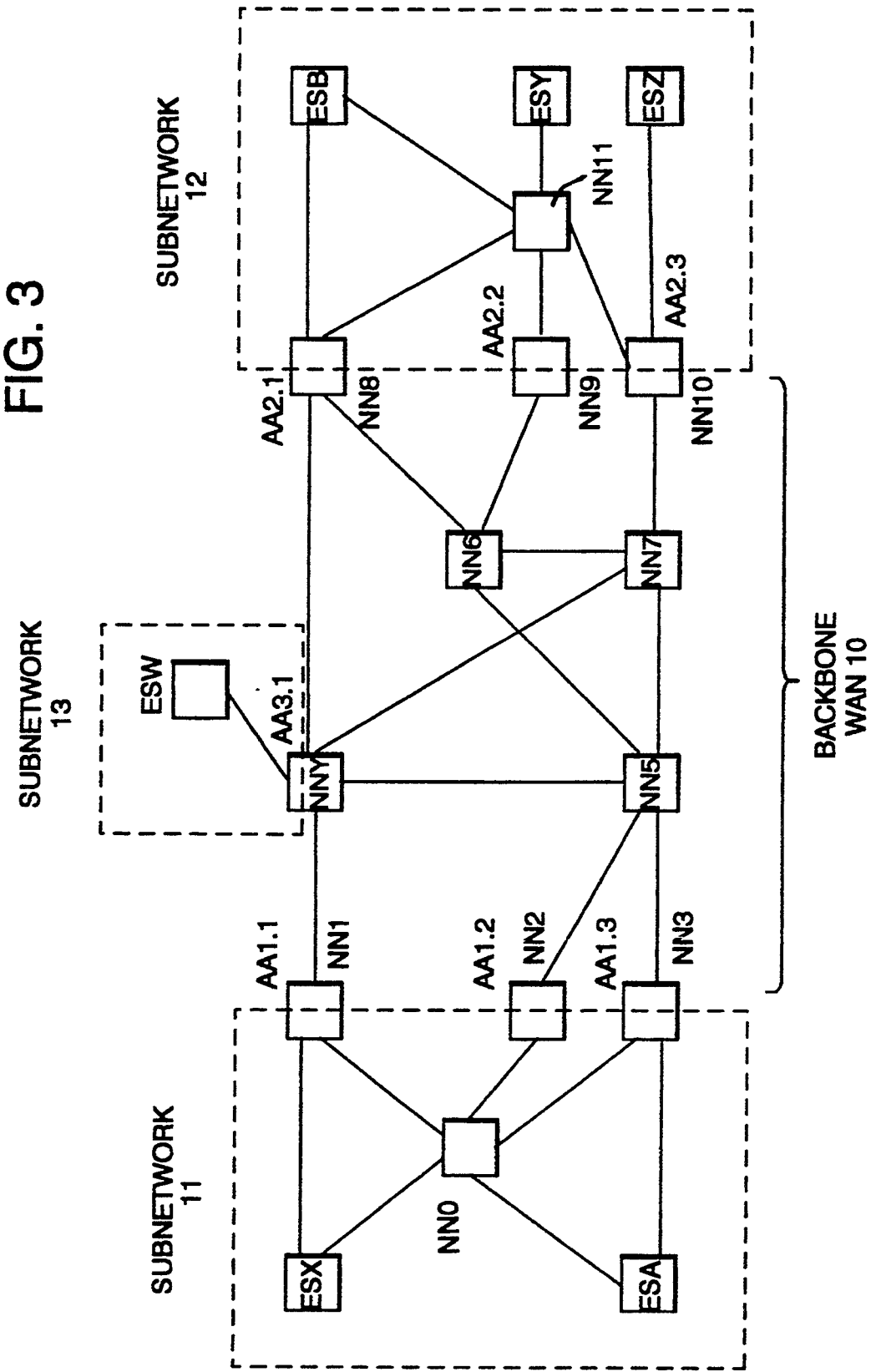
FIG. 3 is an example of a communication network which is used in describing the operation of the present invention.

The present invention will be described relative to the communication network in FIG. 3. The nomenclature used in FIG. 1 is substantially repeated in FIG. 3. The network in FIG. 3 is made up of a backbone WAN 10 to which three subnetworks 11, 12 and 13 have been attached. Each network node NNx, at the interface between WAN 10 and a subnetwork, contains an access agent. The access agents control the communication flow between the WAN and the subnetwork. For example, network nodes NN1, NN2 and NN3 are at the interface with subnetwork 11. Each of these network nodes contains an access agent; access agents AA1.1, AA1.2 and AA1.3 reside, respectively, in network nodes NN1, NN2 and NN3.

The access agents that are common to a subnetwork function as a Multiple Access Group (MAG) whereby the multiple access agents operate to perform communication tasks as a group rather than as a single access agent. The operation of access agents in a multiple access group is described in U.S. patent application filed Nov. 16, 1992, Ser. No. 07/976,826, and entitled "Forming And Maintaining Access Groups At The LAN/WAN Interface." Access agents in a Multiple Access Group (MAG) have been given the same root number (1.0, 2.0 or 3.0) to facilitate this description. Thus, MAG1, in subnetwork 11, has three access agents AA1.1, AA1.2 and AA1.3, while MAG2 also has three access agents AA2.1, AA2.2 and AA2.3. MAG 3, in subnetwork 13, is shown with only one access agent AA3.1.

The subnetworks normally contain multiple end stations: ES-A and ES-X in subnetwork 11, ES-B, ES-Y and ES-Z in subnetwork 12. An end station might be a host computer, a personal computer, a file server, a printer, etc. In the example communications described herein to illustrate the preferred embodiment of the invention, communication is from source end station ES-A to destination end station ES-B.

FIG. 4 is a time-based communication message flowchart of the same type as FIG. 2, and illustrates the function/process of the present invention when used in network/subnetworks in FIG. 3 when the subnetworks are analogous to the point-to-point subnetworks illustrated in FIG. 1. The communication process between ES-A and ES-B begins by ES-A sending a packet message 14 to its designated access agent which is AA1.3. The matching of an end station with a designated access agent may be accomplished by any number of techniques. One technique would be to check the address of the source end station from the communication message, and designate an access agent based on the source address. Alternatively, an end node may be pre-assigned to a network node, as described in FIG. 2.

After the designated access agent AA1.3 receives the packet 14, it queries 16 other access agents AA1.1 and AA1.2 in its group MAG1 for the best route from each of them to ES-A. The best route is determined by accumulating route weights on each link in the route, just as discussed in the Baratz et al U.S. Pat. No. 4,873,517. Weights would typically reflect the communication costs of a route, and include such items as time charges, transmission speed, delays, line integrity, etc.

Access agent AA1.3 also sends a FIND message 18 to each of the access agents AA2.1, AA2.2 and AA2.3 that make up multiple access group two (MAG2). AA1.3 knows to send the FIND message to MAG2 from the destination address information in the packet message 14. The destination address indicates ES-B is the destination end station, and that ES-B is in MAG2. AA1.3 knows the members of MAG2 from the group formation, and maintenance processes for multiple access groups described in U.S. Ser. No. 07/976,826 cited above.

Alternatively, if the destination address is unstructured so that AA1.3 cannot determine the identity of the subnetwork containing ES-B, then AA1.3 could send the FIND message 18 to all MAG's. This is not the preferred embodiment, as it would consume additional WAN resources. The extent to which this may be undesirable depends on the size of the WAN, and on its capabilities to support fast message broadcasts.

Back at MAG1, AA1.1, AA1.2 and AA1.3 determine the best route to ES-A. This is done by accumulating weights of transmission links over all possible paths from each of them to ES-A. AA1.1 and AA1.2, in response to the query from AA1.3, send their best route information as the local information route messages 20 and 22 back to AA1.3. Of course, AA1.3 has the route information of the best route it found from itself to ES-A. At this point in the process, AA1.3 has weights and routes for the best route from ES-A to each of AA1.3, AA1.2 and AA1.1.

Meanwhile in MAG2, AA2.1, AA2.2 and AA2.3 have been determining the best route from each of them to ES-B. This is done in the same manner as it was in MAG1 for routes to ES-A. In addition, AA2.1, AA2.2 and AA2.3 are determining the best route from each of them to each of the access agents in MAG1. This is preferably done from a topology database in each access agent in the same manner as described in Baratz et al U.S. Pat. No. 4,873,517. With this additional information, each of the access agents AA2.1, AA2.2 and AA2.3 determine the best route from ES-B through itself back to each of the access agents AA1.1, AA1.2 and AA1.3 in MAG1. When this retrieval and computation task is complete, AA2.1, AA2.2 and AA2.3 send FOUND messages 24, 26 and 28, respectively, to AA1.3. Each FOUND message contains three routes; the best route from each of the access agents in MAG1 through the access agent in MAG2, who sent the FOUND message, to ES-B. The effect of the process/operation described for MAG1 and MAG2 is to distribute the tasks of determining best routes over all the access agents at the source and destination subnetworks.

The source agent AA1.3, the designated access agent, now knows the best routes and weights therefor from AA1.1, AA1.2 and AA1.3 to ES-A (three routes), and from AA1.1, AA1.2 and AA1.3 to ES-B through AA2.1, AA2.2 or AA2.3 to ES-B (nine routes). By concatenating the route weight information as described in the Baratz patent, AA1.3 selects the best route from ES-A to ES-B. Assuming the result is that the best route is through AA1.1 and AA2.1, AA1.3 sends the SELECT message 30 to AA1.1 to prepare AA1.1 to handle the communication flow between ES-A and ES-B. AA1.2 also sends SELECT message 32 to prepare AA2.1 to handle the communication flow between ES-A and ES-B. At the same time that it sends SELECT message 32, AA1.3 now sends PACKET message 33 (same as PACKET message 14) to AA2.1. AA2.1 passes PACKET 33 onto ES-B.

When ES-B receives the PACKET message, it reads the best route information from the message. The routing information has been added to the PACKET message 14 by AA1.3 and AA2.1. ES-B then sends PACKET RESPONSE message 34 back over the best route through AA2.1 and AA1.1. AA2.1 and AA1.1 do not have to process information in packets now flowing between ES-A and ES-B. Once the communication route is established, AA1.1 and AA2.1 just pass the packets through the route.

In the above example, it was assumed that all the access agents in MAG1 and MAG2 chose to participate in determining the best route. This is not required. An access agent might reject being selected as a part of the best route. This could occur where the access agent's task list is full, or the access agent is otherwise overloaded. In this situation, the access agent when queried by AA1.3 to determine best routes, could send back a no route message refusing to participate in the best route selection process. Alternatively, the access agent might send back route information with artificially high weights for its routes thereby guaranteeing that it would not be selected as part of the best route.

In FIG. 5, the invention is implemented in an environment where the subnetworks of FIG. 3 are source-routing LANs, and the communication protocol followed is Internet Protocol (IP). In this environment, the communication between ES-A and ES-B begins by ES-A sending an Address Resolution Protocol (ARP) message 36. This message is a LAN All-Routes Broadcast (ARB), and is received by all the access agents AA1.1, AA1.2 and AA1.3 in MAG1 in this example. Each access agent in MAG1 identifies AA1.3 as the designated access agent from ES-A's LAN address as encoded in the LAN broadcast packet.

The ARP received by each access agent in MAG1 contains a routing information field. As the ARP travels from ES-A to AA1.1, AA1.2 and AA1.3, each bridge, or node, that it crosses adds routing information for the routes the ARP travels. Each access agent in MAG1, as it receives an ARP across different routes, retains the route information, and then selects the best route from itself to ES-A by evaluating the weights derivable from received routing information. Once the best route to ES-A is selected by AA1.1 and AA1.2, they send best route information, including weights as local route information messages 38 and 40 to designated access agent AA1.3. AA1.3 has the best route information from itself to ES-A, as determined from the ARPs it received.

The designated access agent AA1.3, after it receives an ARP from ES-A, broadcasts FIND message 42 containing the ARP from ES-A to the access agents in MAG2. AA2.1, AA2.2 and AA2.3, in turn, broadcast the ARP from ES-A in subnetwork 12. ES-B gets the ARP, probably more than one, from each of AA2.1, AA2.2 and AA2.3. Each ARP contains routing information on the route it traversed from the MAG2 access agent to ES-B. ES-B reads the ARP, including its routing information. For each ARP message 43 received, ES-B sends an ARP response message 44 back to the same access agent in MAG2 that the ARP message 43 came from. Each ARP RESPONSE 44 from ES-B is not broadcast; it goes back point-to-point to the access agent in MAG2 over the same route that it came in on. After receiving the ARP RESPONSE messages 44, each access agent in MAG2 can then determine the best route from itself to ES-B by accumulating the weights in the routing information in the ARP RESPONSE.

Each access agent in MAG2 also determines the best route from itself to each access agent in MAG1 from WAN route information. The WAN route information would be stored as a topology database, as discussed in the Baratz et al patent, at each access agent. AA2.1, AA2.2 and AA2.3 now have the best route information from each of them to ES-B, and from each of them to each of AA1.1, AA1.2 and AA1.3. Each of AA2.1, AA2.2 and AA2.3 concatenates this information, and sends a FOUND message 46, 48 and 50, respectively, to the designated access agent AA1.3. Each FOUND message contains the best route information from each of AA1.1, AA1.2 and AA1.3 to ES-B through the access agent sending the FOUND message.

As described previously for FIG. 4, AA1.3 now has all the information it needs to select the best route from ES-A to ES-B. AA1.3 concatenates the three local routes within subnetwork 11 with the nine WAN and local destination routes from access agents in MAG1 through access agents in MAG2 to ES-B. There are nine possible best destination routes because there are three access agents in each of the source and destination MAGs. The number of possible best destination routes equals N1 times N2, where N1 and N2 are, respectively, the number of access agents in MAG1 and MAG2.

After concatenating the local route information with the destination route information, AA1.3 concludes that the best route is through AA1.1 and AA2.1. AA1.3 sends SELECT messages 52 and 54, respectively, to AA1.1 and AA2.1 to prepare them to handle the communication between ES-A and ES-B. These SELECT messages go point to point over the selected route; they are not broadcast. In addition, AA1.3 sends ARP 56 (same as ARP 36) point to point to ES-B through AA2.1. ES-B sends back ARP RESPONSE 58 to ES-A over the selected best route. Communication then flows between ES-A and ES-B through AA1.1 and AA2.1, with no further processing of the communication messages by AA1.1 and AA2.1.

Figure 6A:
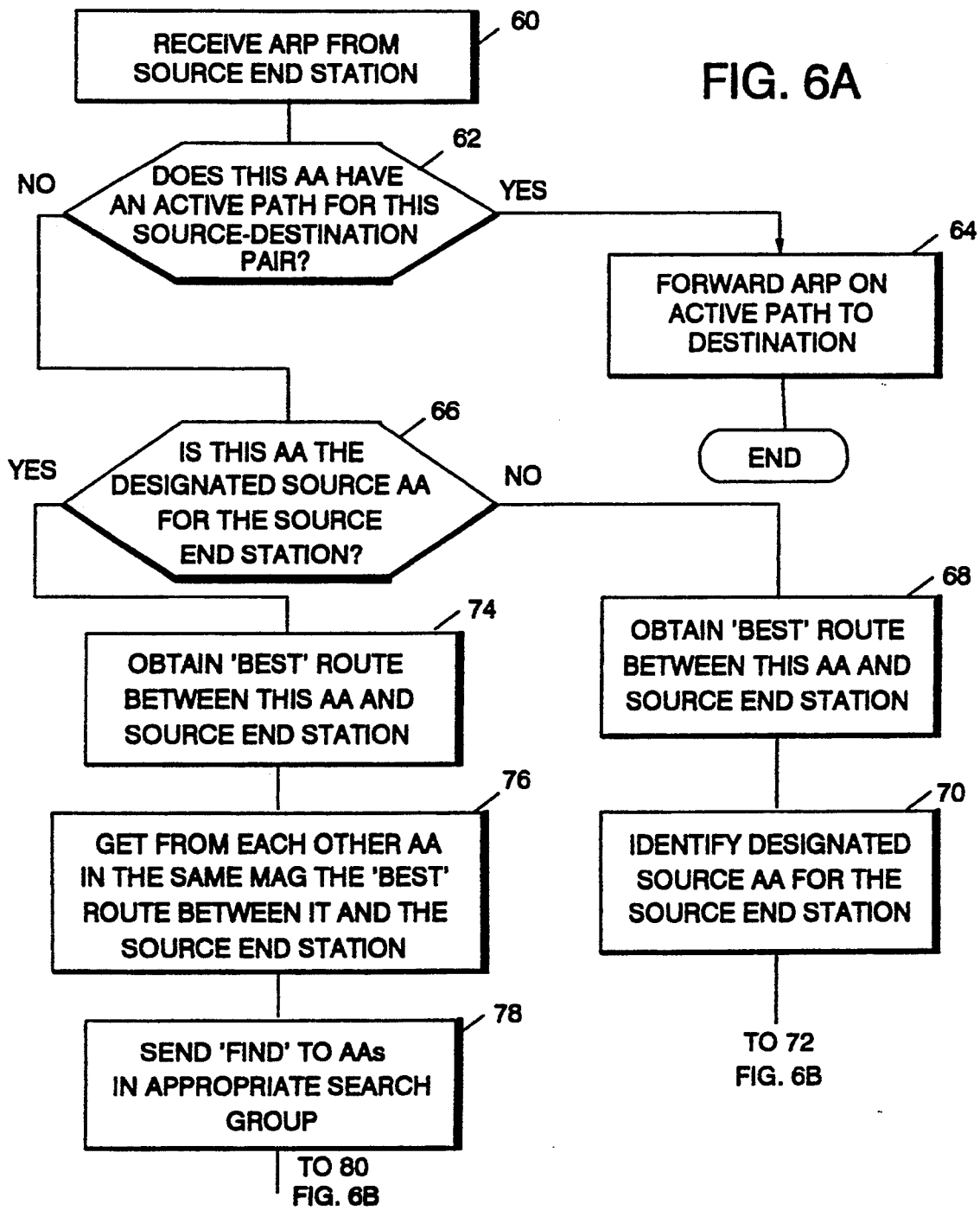
FIG. 6 shows the process and operation of the preferred embodiment of the invention as implemented in the source-end access agents of FIG. 3.
Figure 6B:
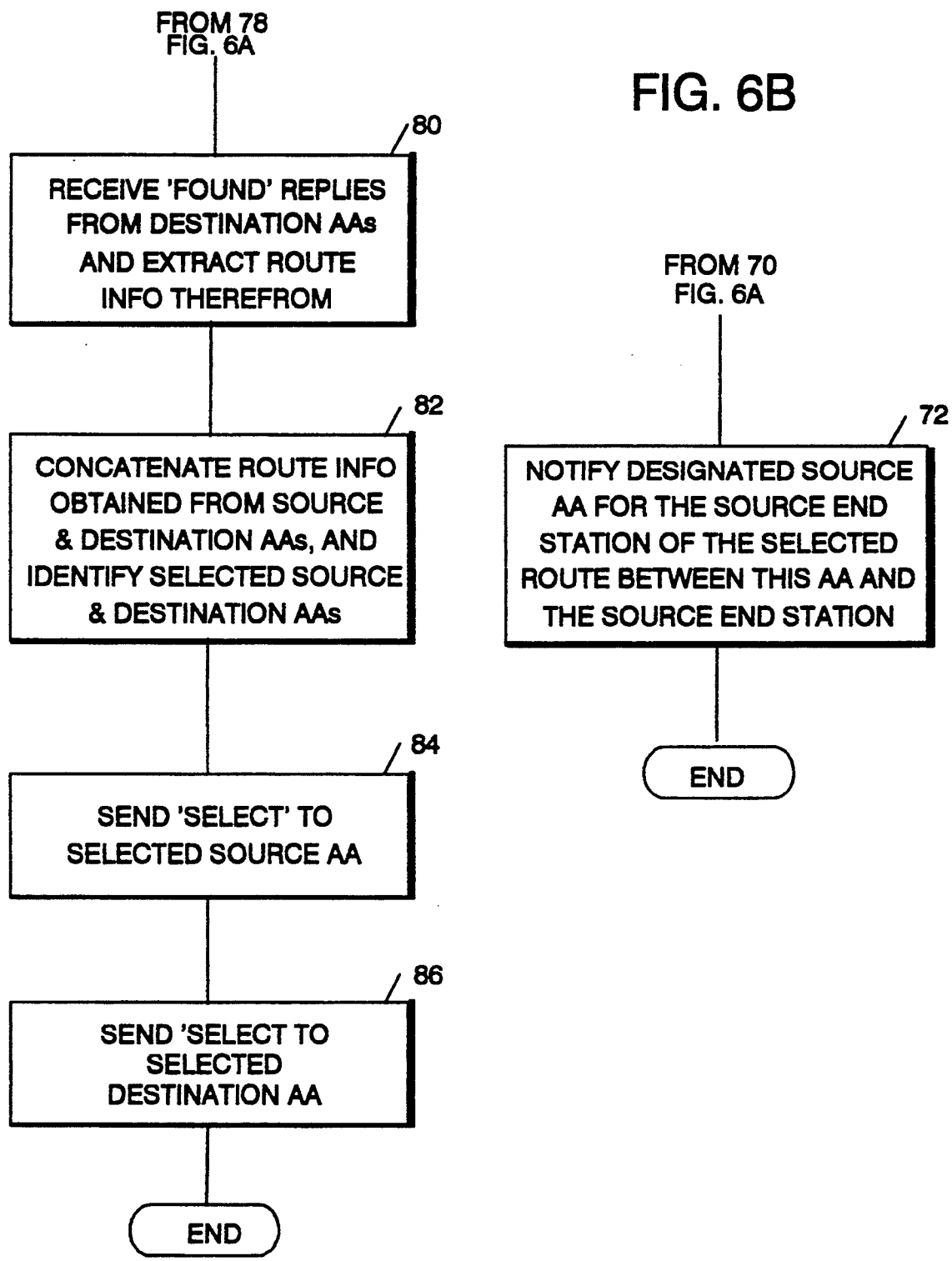

In FIG. 6, the process flow at each access agent at the source end of communications is shown. The process begins at operation 60 with the access agent receiving the ARP message (or PACKET) from the source end station ES-A. Decision 62 tests whether there is an active communication route, or path, for the source-destination pair of end stations identified in the ARP. If the answer is yes, operation 64 simply forwards the ARP over the active path to the destination station ES-B. Decision 62 and operation 64 are not directly involved in the invention, but they would typically be a part of a route selection process.

Decision 66 tests whether the access agent that received the ARP is the designated access agent. If the answer is no, the process flow branches to operation 68. As discussed above for FIG. 5, access agents at the source end receive multiple ARPs over different paths from ES-A. From the routing information tagged to the ARP as it travels to the access agent, the access agent can accumulate the weight of the route traveled by each ARP that reaches it. The access agent in operation 68 selects the best route between ES-A and itself based on the lowest accumulated weight. In operation 70, the access agent identifies the designated access agent for the source end station from the source end station address or identification. The access agent then sends, in operation 72, the local route information message to the designated access agent.

If the answer to decision 66 is yes, the designated access agent at operation 74 obtains the best route information to ES-A in the same manner as the other access agents did in operation 68 described immediately above. At operation 76, the designated access agent receives and stores the local route information sent by the other access agents in operation 72. Operation 78 by the designated access agent is the sending of the FIND message to the destination MAG (Multiple Access Group). While operation 78 is illustrated as being in sequence with operations 74 and 76, operation 78 could also be performed in parallel with operations 74 and 76.

The above process flow implements the example in FIG. 5 where the ARP is broadcast to all source access agents. In the example of FIG. 4 where the packet goes only from ES-A to the designated access agent, the process flow would be slightly different. Decision 66 would not be necessary, and operations 68, 70 and 72 would be initiated by a query from the designated access agent. Also, the designated access agent would send the FIND (operation 78) to the destination group of access agents at the same time it sends the query to the source access agents.

In operation 80, the designated access agent waits until it receives the FOUND messages from access agents in MAG2 (FIG. 5). When the FOUND messages are received and stored, the designated access agent has all the best route information from the source access agents and the destination access agents. Operation 82 concatenates the weighted route information, and identifies the lowest weight route as the best route from the source end station to the destination end station. In operations 84 and 86, the designated access agent sends the SELECT messages to the source access agent and the destination access agent with the routing information on the best route between ES-A and ES-B.

Figure 7:
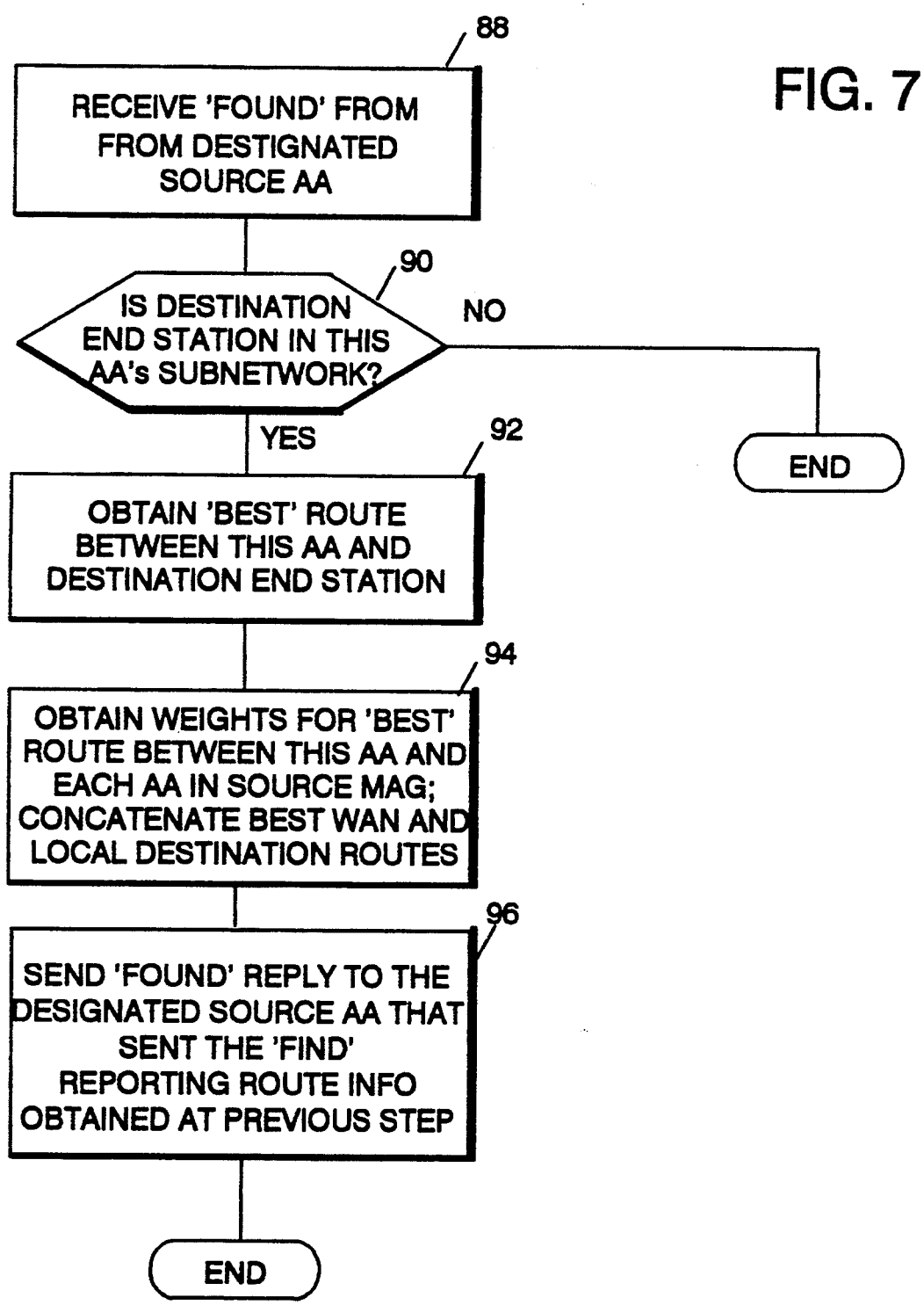
FIG. 7 shows the process and operation of the preferred embodiment of the invention as implemented in the destination-end access agents of FIG. 3.

FIG. 7 shows the process flow for the operation at the destination access agents in response to the FIND message from the designated access agent. After receiving the FIND message during operation 88, a destination access agent, at decision 90, tests whether the destination end station is in its subnetwork. If the answer is no, the process ends. If the answer is yes, the access agent begins operation 92 to find the best route from itself to the destination end station.

As previously described in examples in FIGS. 4 and 5, the best route to the destination end station may be obtained in different ways. For a FIG. 4 implementation, the access agent in operation 92 knows the weights over links in various paths to the destination end station. Therefore, the access agent accumulates these weights, and selects the route to ES-B that has the lowest weight. In the FIG. 5 implementation, operation 92 does not store weight information for links in its subnetwork. Instead, it broadcasts the ARP to the destination end station, and receives a reply from the destination end station. This reply contains route and weight information over each point to point route from the access agent to the end station. The access agent selects the route with the lowest weight.

In operation 94, each destination access agent reviews the weights for the various routes through WAN 10 (FIG. 3) from each source access agent to each destination access agent. These routes and weights are information previously stored in the access agent. From the information, each destination access agent selects the best WAN route from itself to each source access agent. Each destination access agent then concatenates the best WAN route information with the best local route information to the destination end station ES-B. At operation 96, each destination access agent sends a FOUND message, which contains the best route information from source access agents to ES-B to the designated access agent. Each FOUND message contains three routes, as previously described in reference to FIGS. 4 and 5. The FOUND process is thus completed.

Figure 8A:
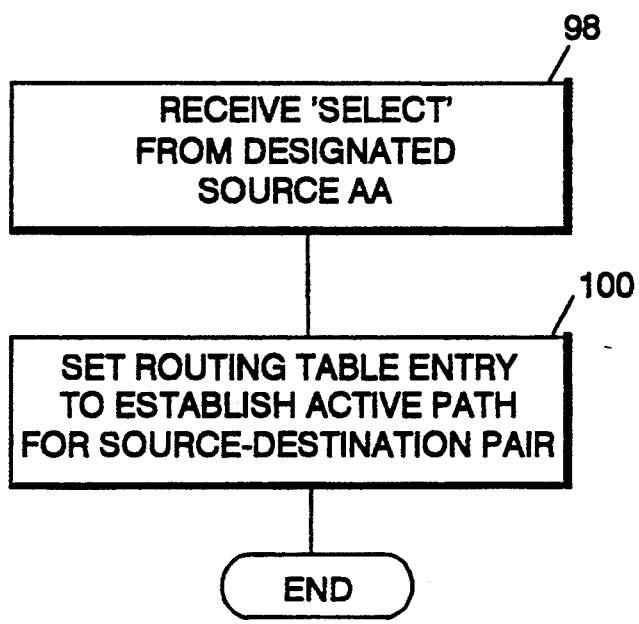
FIG. 8A shows the process and operation of the preferred embodiment of the invention as implemented in the source-end access agent selected for the best route.
Figure 8A:
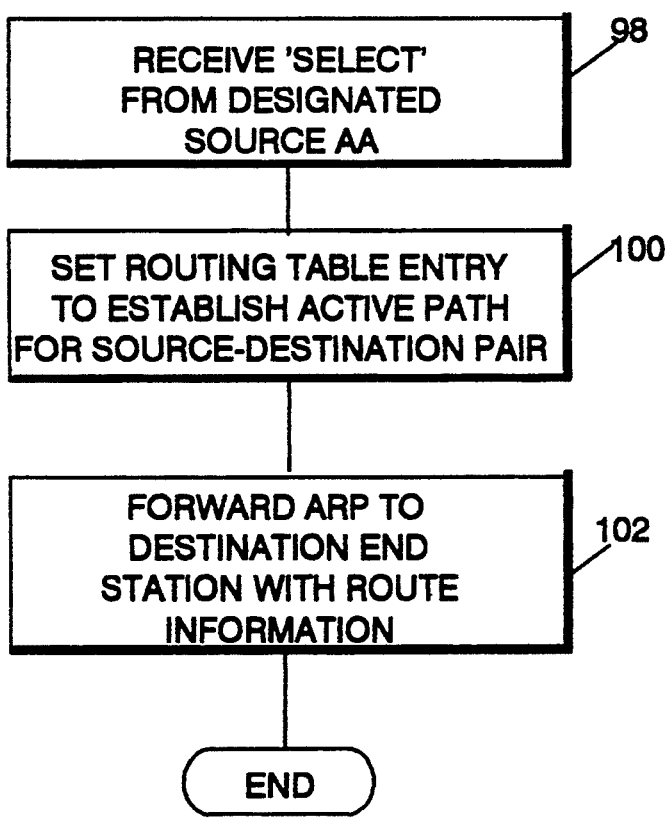

FIGS. 8A and 8B described the processing of SELECT messages by the access agents selected for the best route from ES-A to ES-B. In both cases, the selected source access agent and selected destination access agent receive the SELECT message in operation 98. In operation 100, they each set their routing table which establishes the active path of communication flow between end stations. In addition, in FIG. 8B, the selected destination access agent in operation 102 forwards to the destination end station the ARP (FIG. 5), or the PACKET (FIG. 4) from the source end station. This prompts the destination end station to reply, and the communication flows between source and end stations.

In the preferred embodiments, the destination access agents have combined the WAN best route information with the best route information in the destination subnetwork. It will be appreciated by one skilled in the art, that the source access agents could have obtained the WAN best route information, and combined it with their best route information in the source subnetwork. In this event, the designated access agent would only receive three best routes from the three destination access agents, and would receive nine best routes from the source access agents. Further, in yet another variation on the invention, weight information could be sent back to the designated access agent rather than routing information. The designated access agent would select the best routes based on the weight information, and select the access agents, as before, with the SELECT message. The selected access agents would then set the routes.

While a number of preferred embodiments of the invention have been shown and described, it will be appreciated by one skilled in the art, that a number of further variations or modifications may be made without departing from the spirit and scope of our invention.

What is claimed is:

1. A selection apparatus for use in a communication network having a Wide Area Network (WAN) and a plurality of subnetworks, an interface between the WAN and each subnetwork, and having one or more access agents at each interface, said selection apparatus for selecting the best route between a first end station in a first subnetwork and a second end station in a second subnetwork, said selection apparatus comprising:

a plurality of first access agent means in the first subnetwork for routing communication flow between a first end station and the wide area network, and for finding first, best-route information from each first access agent means to the first end station;

a plurality of second access agent means in a second subnetwork for routing communication flow between the second end station and the wide area network, and for finding second, best-route information from each second access agent means to the second end station, and for finding WAN, best-route information between each of said first access agent means and each of said second access agent means; and selecting access agent means responsive to each of said first and second access agent means for selecting the best route from the first end station to the second end station based on the first, best-route information from said first access agent means, the WAN, best-route information from the second access agent means, and the second, best-route information from said second access agents means.

2. The apparatus of claim 1 and additionally comprising:

first means for distributing to each first access agent means the task of finding the first best-route from the first end station through the first subnetwork; and second means for distributing to each second access agent means the task of finding the best WAN route between each of said first and second access agent means, and the best route from the second end station through the second subnetwork.

3. The apparatus of claim 2 wherein said first distributing means comprises:
   means in the first end station for broadcasting to each first access means a request for communication with the second end station.

4. The apparatus of claim 3 wherein said second distributing means comprises:
   means in said selecting access agent means for broadcasting to each second access means a request for best route information to the second end station.

5. The apparatus of claim 2 wherein said first and second distributing means comprises:
   said selecting access agent means querying each of said first and second access agent means for best route information.

6. The apparatus of claim 1 wherein each of said second access agent means comprises:
   means for finding the second, best-route information from each second access agent means to the second end station;
   means for finding the WAN, best-route information between each of said first access agent means and each of said second access agent means; and
   means for concatenating the second, best-route information with the WAN, best-route information to obtain combined WAN and second, best-route information from each of said first access agent means through each of said second access agent means to said second end station.

7. The apparatus of claim 6 wherein said selecting access agent means comprises:
   means responsive to each of said first access agent means for receiving the first best-route information from the first end station to each of said first access means;
   means responsive to each of said second access agent means for receiving the combined best-route information from the second end station to each of said first access agent means; and
   means for concatenating the first best-route information with the combined best-route information to obtain best-route information from said first end station to said second end station.

8. A method for selecting a best communication route from a source end station to a destination end station through a communication network having a Wide Area Network (WAN) and subnetworks attached to the wide Area Network, an interface between the WAN and each subnetwork, and each subnetwork containing one or more end stations, said communication network having one or more access agents at the interface between the WAN and each subnetwork, said method comprising the steps of:
   finding a best source route from each source access agent to the source end station;
   finding a best destination route from each destination access agent to the destination end station;
   finding a best WAN route from each source access agent to each destination access agent;
   first, concatenating the best WAN route with either the best source route, or the best destination route for each access agent thereby producing a best combined route from each of the access agents at the source, or destination end, to the end station at the other end; and
   second, concatenating the best combined route with either the best source route or the best destination route based on the route not having been concatenated by said first concatenating step whereby the best route from the source end station to the destination end station is selected.

9. The method of claim 8 wherein said first and second concatenating steps comprise, respectively:
   first, concatenating the best WAN route with the best destination route for each access agent, thereby producing the best combined route from each of the source access agents through each destination access agent to the destination end station; and
   second, concatenating the best combined route with the best source route to select the best route from the source end station to the destination end station.

10. The method of claim 9 wherein one of said source access agents is designated as paired with the source end station and thereby becomes a designated source access agent, and wherein said best source route finding step comprises the steps of:
    querying by the designated source access agent to the other source access agents for the best route from each source access agent to the source end station;
    obtaining thereafter at each source access agent the best route from the source access agent to the source end station; and
    notifying the designated source access agent of the best route from each source access agent to the source end station.

11. The method of claim 10 wherein said best destination route finding step comprises the steps of:
    sending a find message from the designated source access agent to each of the destination access agents; and
    obtaining, in response to the find message, the best route from each destination access agent to the destination end station.

12. The method of claim 11 wherein said first concatenating step comprises:
    concatenating at each of the destination access agents the best WAN route from each source access agent to the destination access agent and the best destination route from the access agent to the destination end station, thereby producing the best combined route from each of the source access agents through each destination access agent to the destination end station; and
    sending a found message from each of the destination access agents to the designated source access agent, said found message containing the best route from each source access agent to the destination end station through the destination access agent sending the found message.

13. The method of claim 9 wherein one of said source access agents is designated as paired with the source end station and thereby becomes a designated source agent, and wherein said best source route finding step comprises the steps of:
    broadcasting a communication request from the source end station to each of the source access agents;
    obtaining, in response to the communication request, the best route from each source access agent to the source end station; and notifying the designated source access agent of the best route from each source access agent to the source end station.

14. The method of claim 13 wherein said best destination route finding step comprises the steps of:
broadcasting a find message from the designated source access agent to each of the destination access agents;
broadcasting, in response to the find message, the communication request from each destination access agent to the destination end station;
sending a communication request response from the destination end station to each destination access agent; and
obtaining from the communication request responses the best destination route from the destination end station to each destination access agent.

15. The method of claim 14 wherein said first concatenating step comprises:
concatenating, at each of the destination access agents, the best WAN route from each source access agent to the destination access agent and the best destination route from the destination access agent to the destination end station, thereby producing the best combined route from each of the source access agents through each destination access agent to the destination end station; and
sending a found message from each destination access agent to the designated source access agent, said found message containing the best route from each source access agent to the destination end station through the destination access agent sending the found message.

* * * * *